(12) United States Patent
Lilien et al.

(10) Patent No.: US 10,317,570 B2
(45) Date of Patent: Jun. 11, 2019

(54) METHOD AND SYSTEM FOR MEASURING A PERPENDICULAR WIND COMPONENT

(71) Applicant: Ampacimon S.A., Angleur (BE)

(72) Inventors: Jean-Louis Lilien, Angleur (BE); Huu-Minh Nguyen, Liege (BE); Bertrand Godard, Seraing (BE)

(73) Assignee: Ampacimon S.A., Angleur (BE)

( * ) Notice: Subject to any disclaimer, the term of this patent is extended or adjusted under 35 U.S.C. 154(b) by 158 days.

(21) Appl. No.: 14/733,602

(22) Filed: Jun. 8, 2015

(65) Prior Publication Data

US 2015/0268379 A1  Sep. 24, 2015

Related U.S. Application Data

(63) Continuation-in-part of application No. PCT/EP2013/055180, filed on Mar. 13, 2013, which
(Continued)

(51) Int. Cl.
*G01W 1/00* (2006.01)
*G01P 5/12* (2006.01)
(Continued)

(52) U.S. Cl.
CPC ............... *G01W 1/00* (2013.01); *G01P 5/02* (2013.01); *G01P 5/12* (2013.01); *G06F 17/00* (2013.01);
(Continued)

(58) Field of Classification Search
None
See application file for complete search history.

(56) References Cited

U.S. PATENT DOCUMENTS

| 4,728,887 A | 3/1988 | Davis |
| 5,029,101 A | 7/1991 | Fernandes |

(Continued)

FOREIGN PATENT DOCUMENTS

| EP | 1 574 822 A1 | 9/2005 |
| KR | 10 2009 0050671 A | 5/2009 |

(Continued)

OTHER PUBLICATIONS

Yan et al., "Numerical Study on Dynamic Swing of Suspension Insulator String in Overhead Transmission Line under Wind Load" IEEE Transactions on Power Delivery, vol. 25, No. 1, Jan. 2010.*
(Continued)

*Primary Examiner* — John C Kuan
(74) *Attorney, Agent, or Firm* — Reinhart Boerner Van Deuren P.C.

(57) ABSTRACT

A system and method for measuring a perpendicular wind speed component with respect to a suspended cable span. The method includes monitoring a motion of at least one point of the suspended cable span over a time interval, and determining whether the motion includes Aeolian vibration. If the motion does not include Aeolian vibration, a transverse swing angle of the suspended cable span is measured and the perpendicular wind speed component is calculated as a function of the transverse swing angle. If the motion includes Aeolian vibration, a frequency of the Aeolian vibration is measured and said perpendicular wind speed component is calculated as a function of the Aeolian vibration frequency. The method may include measuring an effective incident radiation and for determining a maximum allowable current rating, or "ampacity", for the suspended cable span, as well as for supplying electric power over a power line comprising said power span.

16 Claims, 10 Drawing Sheets

Related U.S. Application Data is a continuation of application No. 13/709,474, filed on Dec. 10, 2012, now abandoned.

(51) Int. Cl.

| *H02G 7/00* | (2006.01) |
|---|---|
| *H02G 1/02* | (2006.01) |
| *H01P 5/02* | (2006.01) |
| *G06F 17/00* | (2019.01) |
| *G01P 5/02* | (2006.01) |

(52) U.S. Cl.
CPC .............. *H02G 1/02* (2013.01); *H02G 7/00* (2013.01); *Y04S 10/26* (2013.01); *Y04S 10/30* (2013.01)

(56) References Cited

U.S. PATENT DOCUMENTS

| 5,140,257 | A | 8/1992 | Davis |
| 5,341,088 | A | 8/1994 | Davis |
| 5,559,430 | A | 9/1996 | Seppa |
| 5,933,355 | A | 8/1999 | Deb |
| 6,205,867 | B1 | 3/2001 | Hayes et al. |
| 6,441,603 | B1 | 8/2002 | Lawry |
| 7,430,932 | B2 | 10/2008 | Mekhanoshin et al. |
| 8,184,015 | B2 | 5/2012 | Lilien et al. |
| 2009/0243876 | A1 | 10/2009 | Lilien et al. |
| 2012/0029871 | A1 | 2/2012 | Sillane |
| 2012/0173146 | A1 | 7/2012 | Mohr et al. |
| 2012/0278011 | A1 | 11/2012 | Lancaster |
| 2012/0303293 | A1 | 11/2012 | McNeill et al. |
| 2014/0143578 | A1* | 5/2014 | Cenizal ............. H02J 13/00 713/340 |
| 2015/0304487 | A1* | 10/2015 | Chaput ............. H01T 19/02 248/550 |

FOREIGN PATENT DOCUMENTS

| NO | 318809 B1 | 5/2005 |
| WO | WO 2004/038891 A2 | 5/2004 |
| WO | WO 2010/054072 A1 | 5/2010 |

OTHER PUBLICATIONS

Endevco, "Practical understanding of key accelerometer specifications" available at http://endevco.com/news/emails/2011_12/tp328.pdf (last retrieved on Jul. 12, 2018).*

Analog Devices, "Accelerometer Specifications—Quick Definitions" available at http://www.analog.com/en/products/landing-pages/001/accelerometer-specifications-definitions.html (last retrieved on Jul. 12, 2018).*

E. Simiu et al.; Wind effects on structures; 1996; John Wiley & Sons, Inc. pp. 216-229.

R.D. Blevins; Flow Induced Vibration; 1990; Van Nostrand Reinhold, New York, Second Edition; pp. 43-67.

B. Godard et al.; Original real-time observations on Aeolian vibrations on power-line conductors; Oct. 2011; IEEE Transactions on Power Delivery; vol. 26, No. 4, pp. 2111-2117.

S. Guérard et al.; Aeolian vibrations on power line conductors, evaluation of actual self damping; Feb. 22, 2010; IEEE; pp. 1-6.

G. Diana et al.; Aeolian Vibration; EPRI Transmission Line Reference Book—Wind-Induced Conductor Motion; Second Edition; pp. 2-1-2-158.

Task Force B2.12.3; Calcuation of Sag-tension for Overhead Power Lines; Jun. 2007; 90 pages.

Working Group B2.12; Guide for Selection of Weather Parameters for Bare Overhead Conductor Ratings; Aug. 2006; 55 pages.

Working Group B2.36; Guide for Application of Direct Real-Time Monitoring Systems; Jun. 2012; 79 pages.

Working Group 22.12; Thermal Behaviour of Overhead Conductors; Aug. 2002; 46 pages.

Lu M L et al; Accuracy of Transmission Line Modeling Based on Aerial LiDAR Survey; IEEE Transactions on Power Delivery, IEEE Service Center, New York, NY US; vol. 23, No. 3; Jul. 2008 (Jul. 2008); pp. 1655-1663.

* cited by examiner

METHOD AND SYSTEM FOR MEASURING A PERPENDICULAR WIND COMPONENT

CROSS-REFERENCE TO RELATED PATENT APPLICATIONS

This patent application is a continuation-in-part of pending PCT Application No. PCT/EP2013/055180, filed Mar. 13, 2013, which is a continuation of U.S. application Ser. No. 13/709,474, filed Dec. 10, 2012, the entire teachings and disclosure of which are incorporated herein by reference thereto.

TECHNICAL FIELD

The disclosure relates to a method and system for measuring a perpendicular wind speed component with respect to a suspended span of cable. It also relates to methods for measuring an effective incident radiation and for determining a maximum allowable current rating for such a suspended span of cable, as well as to the implementation of these methods through a computer program or a memory carrier containing a computer-readable instruction set.

BACKGROUND

A local measure of the wind speed can be useful for a number of applications, and in particular for monitoring the thermal behavior of power lines, since cooling by the wind component perpendicular to the power lines is one of the main factors in this thermal behavior.

As explained in U.S. Pat. No. 8,184,015, continuous monitoring of electrical power lines, in particular high-voltage overhead lines, is essential to timely detect anomalous conditions which could lead to a power outage. Measurement of the sag of power line spans between successive supports to determine whether the sag is lower than a maximum value is becoming a mandatory requirement in some countries.

U.S. Pat. No. 8,184,015 disclosed a device and method for continuously monitoring the sag on a power line span. This method allowed the determination of mechanical dynamic properties of the power lines just by sensing mechanical vibrations in a frequency range from 0 to some tens of Hertz. Indeed, power lines in the field are always subject to movements and vibrations, which may be very small but detectable by their accelerations in both time and frequency domains.

Such properties may also be used to determine many other features. The new method of the present invention can also be used by other devices equipped with accelerometers.

The maximum allowable constant electrical current rating which will meet the design, security and safety criteria, such as electrical clearance, of a particular power line on which an electrically conductive cable is used is known as the "ampacity", as described for instance in "Sag-tension calculation methods for overhead lines", published in 2007 as CIGRE Technical Brochure No. 324 by Study Committee B2 of The International Council on Large Electric Systems (CIGRE). Methods to evaluate the ampacity of a suspended cable span on the basis of various data are explained for instance in A. Deb's "Power line ampacity system", published in 2000 by CRC Press, and in technical brochures from international organizations, such as CIGRE Technical Brochures No. 207 ("Thermal behaviour of overhead conductors") and No. 498 ("Guide for application of direct real-time monitoring systems"), respectively published in 2002 and 2012, as well as in abovementioned CIGRE Technical Brochure No. 324. The methods disclosed in these documents use weather data as locally measured or simulated following international recommendations as explained, for example, in CIGRE Technical Brochure No. 299 ("Guide for selection of weather parameters for bare overhead conductor ratings"), published in 2006 or IEEE Standard 738-2006 for calculating the current-temperature of bare overhead conductors, published in 2006.

A drawback of these methods for measuring or simulating weather conditions is that none of them is able to generate appropriate weather data which are actually to be used to calculate ampacity, which is a value linked to all critical spans of a power line. A critical span is a span for which there is a significant risk of potential clearance violation in any kind of weather situations. Which spans are critical may depend i.a. on the span orientation, local screening effects, and local obstacles such as vegetation, buildings, roads, etc. They are normally defined at the design stage but may be reviewed by more modern techniques like Light Detection And Ranging (LIDAR) survey.

The wind speed has a dramatic impact on power line ampacity as it is the main variable responsible for cooling down the conductor, and hence for the sag value. However, wind speed measurement is complicated for various reasons. Firstly, wind speed is not stationary and can vary significantly within minutes, apart from the sudden changes linked to wind gusts. Secondly, wind speed also varies along the span. For example, according to Simiu E. and Scanlan R., in "Wind effects on structures", published by John Wiley & Sons, Inc in 1996, wind vortices have a typical average size of several tens of meters. Therefore, a typical suspended cable span of a power line, with a length of several hundreds of meters, is subject to a variable wind speed along this length. Thirdly, the wind speed also greatly varies in a vertical direction, since the conductive cable span is suspended within the atmospheric boundary layer, and the lowest point of the suspended cable span is generally about 10 meters over the ground. The wind speed may also vary due to local effects, such as screening from trees or buildings or the height of the suspended cable, which may change in a single span by more than 15 meters just by its sag, but may additionally be subject to ground level differences between the end points of the span. Because the cable is suspended in the atmospheric boundary layer, such local differences in height near the ground can have significant effect in the wind speed. Therefore, a single-spot wind speed measurement is normally insufficient to compute the global effect of the wind over the whole span.

All of these factors are particularly important for low wind speeds, in particular for wind speeds whose component perpendicularly to the conductor axis is lower than 3 m/s. Such low wind speeds are critical for ampacity determination. Similarly, a single-spot measurement of the effective incident radiation does not allow computing the global effect of the combined effect of sun and albedo over the whole span.

Given the importance of power line monitoring, several devices have been proposed to measure at least some of the relevant parameters. For example, in the second edition of the EPRI Transmission Line Reference book "Wind induced conductor motion", published in 2009, it was disclosed to use displacement measurement systems placed at a given short distance (e.g. 89 mm) from a cable suspension point in order to measure high-frequency vibrations. However, this is only a partial solution to the monitoring problem and such systems are solely oriented to evaluate the life time of power line conductors due to the bending fatigue induced by Aeolian vibrations cycles on conductor strands near clamps.

A number of different methods to measure the sag of a suspended cable span are also known. An example of tentative sag measurement consists in the optical detection of a target clamped on the monitored conductor by a camera fixed to a pylon, as disclosed in U.S. Pat. No. 6,205,867. Other examples of such methods include measurement of the temperature, tension or inclination of the conductor in the span. A conductor replica is sometimes attached to the tower to catch an assimilated conductor temperature without Joule effect. Besides the fact that these methods only allow a partial monitoring of the power line, such methods suffer from other drawbacks: optical techniques are sensitive to reductions of the visibility induced by meteorological conditions while the other measurement methods depend on uncertain models and/or data which may be unavailable and/or uncertain, e.g. wind speeds, topological data, actual conductor characteristics, etc.

U.S. Pat. Nos. 5,140,257 and 5,341,088 disclose a monitoring device whose housing is attached to the conductor. Some features of this device are related to the measurement of wind speed and direction based on hot wire anemometers. However, hot wire anemometers are extremely difficult to manage in such close proximity to a high-voltage power line. Moreover, the measured wind speed may be altered by the sensor itself, since the hot wire needs to be protected against corona discharges.

U.S. Pat. Nos. 6,441,603 and 5,559,430 disclose a monitoring device for rating an overhead power line, which is not attached to the conductive cable of the power line, but replicates it instead. The evaluation of the combined effect of wind, solar radiation, albedo, and ambient temperature is based on the behavior of dedicated rods installed separately from the conductive cable. The drawback of such a local replication, however, is that the variations in wind speed and effective incident radiation along the span are not taken into account.

Consequently, such a local measurement may not be a good indication of the actual mean wind speed and global incident radiation along spans of several hundreds of meters with possibly variable heights and variable winds along the span. Moreover, using a replica may cause additional errors with respect to the mean values of conductor emissivity and absorptivity and global incident radiation along the whole span of suspended conductive cable.

U.S. Pat. No. 4,728,887 discloses a monitoring device whose housing is adjacent to an overhead line. However, there is no information about how wind speed and its direction may be taken into account to evaluate ampacity.

U.S. Pat. No. 5,933,355 discloses software to evaluate ampacity of a power line. This software, however, has no relationship with wind speed measurement.

U.S. Pat. No. 6,205,867 discloses a power line sag monitor based on inclination measurement. There is however no information about how wind speed and direction may be measured to calculate ampacity.

PCT Patent Application Publication WO 2010/054072 is related to real time power line rating. It alleged the existence of a sensor about wind speed direction and amplitude but did not disclose how these sensors are constituted.

PCT Patent Application Publication WO 2004/038891 and Norwegian Patent Application Publication NO 20024833 disclose a monitoring device whose housing is attached to a suspended cable. The wind is measured by "a traditional wind gauge" and that such wind gauge "operates with an opening in the outer casing". However, a drawback of traditional wind gauges is that the gauge itself constitutes a perturbation in the local measurement and low wind speeds cannot be measured properly by such a gauge.

European Patent Application Publication EP 1.574.822 discloses a monitoring device whose housing is attached to a suspended cable. There is however no information about how wind speed and direction may be taken into account to evaluate ampacity.

Korean Patent Application Publication KR 2009/0050671 discloses a monitoring device whose housing is attached to the conductor. However, this document does not disclose how the effective wind speed, perpendicularly to the conductor, can be measured below 3 m/s, which is the basic case for ampacity determination.

U.S. Patent Application Publication US 2012/0029871 A1 discloses a monitoring device whose housing is attached to the conductor. However, this document does not disclose how to evaluate the wind speed to consider for ampacity determination. On the website http://www.lindsey-usa.com/newProduct.php, it is stated that the sensors in one such monitoring device may be tasked to detect "galloping" and Aeolian vibration, which is an indication of wind blowing across the suspended cable.

In the abovementioned books "Wind effects on structures" and "Wind induced conductor motion" it was already disclosed that Aeolian vibration frequencies are linked to wind speed. Furthermore, in the articles "Original Real-time Observations of Aeolian Vibrations on Power-Line Conductors" and "Aeolian Vibrations on Power-Line Conductors, Evaluation of Actual Self Damping", both published by Godard, B, Guerard, S, & Lilien, J.-L. in IEEE Transactions on Power Delivery, 26(4), 2012, it was also disclosed that, since Aeolian vibrations are generated by von Karman vortex shedding, perpendicular wind speed can be calculated following the Strouhal formula:

$$Str = \frac{f \cdot d}{u}$$

wherein Str is a dimensionless Strouhal number characteristic of the cable, f is an Aeolian vibration frequency, d is a cross-sectional diameter of the cable, and u a perpendicular wind speed component relative to the suspended cable span.

Although it is thus known that the perpendicular wind speed component can be measured through Aeolian vibration frequencies, the drawback remains that such Aeolian vibrations are normally only present at certain wind speed ranges, and in particular at relatively low wind speeds. Even though these ranges are most critical, for instance, for the determination of the ampacity of an overhead power line, the drawback remains that is not possible to measure the perpendicular wind speed component across all wind speed ranges based on Aeolian vibration frequencies only.

SUMMARY

A first object of the disclosure is that of providing a method for measuring a perpendicular wind speed component with respect to a suspended cable span which is effective across all wind speed ranges, and provides a value which is representative of the mean perpendicular wind speed effect along the entire suspended cable span.

Accordingly, in at least one illustrative embodiment, this method comprises the steps of monitoring a motion of at least one point of said suspended cable span over a time interval, and determining whether said motion comprises an Aeolian vibration. If said motion is not determined to comprise an Aeolian vibration, a transverse swing angle of the suspended cable span is measured and said perpendicular wind speed component is calculated as a function of said transverse swing angle, whereas if said motion is determined to comprise an Aeolian vibration, a frequency of said Aeolian vibration is measured and said perpendicular wind speed component is calculated as a function of said Aeolian vibration frequency.

Measuring the perpendicular wind speed component through Aeolian vibration frequencies in the motion of at least one point of the suspended cable span has been proven to provide accurate and effective measurements for a low speed range. On the other hand, the accuracy and effectiveness of measuring the perpendicular wind speed component through the transverse swing angle increases with the wind speed. Consequently, by first determining whether the motion presents an Aeolian vibration, and using these two different modes to measure the perpendicular wind speed component depending on whether such an Aeolian vibration is present or not, it is possible to measure a representative value for the mean perpendicular wind speed component effectively and accurately across a broad range of wind speeds.

In particular, said function of the Aeolian vibration frequency may be a linear proportional function, and more specifically be defined by the equation:

$$u(f) = \frac{f \cdot d}{Str}$$

wherein u(f) is the perpendicular wind speed component in m/s calculated as a function of the Aeolian vibration frequency, f is the Aeolian vibration frequency in Hz, d is a cross-sectional diameter of the cable in m, and Str a dimensionless Strouhal number of the cable. Since the Aeolian vibration frequency is linked to the von Karman vortex shedding governed by this equation, the equation allows a simple yet effective and accurate calculation of the perpendicular wind speed component.

On the other hand, in the other mode, said function of the transverse swing angle may be defined by the equation:

$$u(\vartheta) = \sqrt{k_i g \tan \vartheta}$$

wherein u($\vartheta$) is the perpendicular wind speed component in m/s calculated as a function of the transverse swing angle, $\vartheta$ the transverse swing angle, and $k_i$ a predetermined coefficient in m. In particular, said predetermined coefficient $k_i$ may be at least initially calculated according to the equation:

$$k_i = 2 \frac{\rho_c}{\rho_f c_D d}$$

wherein $\rho_c$ is a linear density of the cable, that is, its mass per unit of length in kg/m, $\rho_f$ is an air density, wherein $\rho_f$=1.184 kg/m$^3$ at atmospheric pressure and an ambient temperature $T_a$=298 K, $c_D$ an aerodynamic drag coefficient of the cable, and d a cross-sectional diameter of the cable in m, as the transverse swing angle is indeed the result of a balance between the weight of the suspended cable and its drag with respect to the perpendicular wind speed component.

Nevertheless, the parameters determining said coefficient $k_i$, such as the air density $\rho_f$ and in particular the aerodynamic drag coefficient $c_D$, present a significant variability in response to various environmental conditions. It may thus be useful to recalibrate the predetermined coefficient $k_i$ on the basis of an accurate measurement of the perpendicular wind speed coefficient. As discussed above, such an accurate measurement may be provided through the frequency of Aeolian vibrations when they are present. Consequently, for the purpose of such a recalibration, said transverse swing angle of the suspended cable span may be measured even when said motion is determined to comprise an Aeolian vibration, and said predetermined coefficient $k_i$ then recalculated according to the equation:

$$k_i = \frac{[u(f)]^2}{g \tan \vartheta}$$

wherein u(f) is the perpendicular wind speed component calculated as a function of the Aeolian vibration frequency. The recalculated coefficient $k_i$ can then be subsequently used in the alternative wind speed measuring mode when Aeolian vibrations are no longer present. Since the relationship between the transverse swing angle and the perpendicular wind speed component may become increasingly inaccurate with decreasing wind speeds, said predetermined coefficient $k_i$ may be recalculated when said motion is determined to comprise an Aeolian vibration only if the perpendicular wind speed component and/or said transverse swing angle exceed a predetermined threshold, in order to preserve the accuracy of the coefficient $k_i$.

Various techniques may be used to determine whether the monitored motion comprises an Aeolian vibration. In particular, it may be determined that said motion comprises an Aeolian vibration if frequency analysis of the motion during a successive series of analysis periods within said time interval reveals vibration frequencies within a predetermined frequency range, with a positive correlation coefficient between the revealed vibration frequencies in said successive analysis periods above a predetermined threshold and/or with a ratio between vertical and horizontal vibration components above another predetermined threshold. For example, said predetermined frequency range may be for example above 0 Hz and not higher than 150 Hz, the predetermined threshold for said positive correlation coefficient may be at least 0.75, and the predetermined threshold for said ratio between vertical and horizontal vibration components may be at least 3.

Furthermore, said motion may be monitored using an accelerometer set fixed to said suspended cable span, using for instance the device disclosed in abovementioned U.S. Pat. No. 8,184,015, which is incorporated by reference. In particular, said accelerometer set may have a resolution equal to or below 100 micro-G, and/or measure motion in at least two axes perpendicularly to said cable. The same accelerometer set may also be used to measure said transverse swing angle $\vartheta$.

By measuring abovementioned perpendicular wind speed component, it also becomes possible to measure an effective incident radiation on a suspended span of electrically conductive cable, since said perpendicular wind speed component and effective incident radiation are separate factors in the thermal balance of the suspended cable span. Consequently, another object of the present disclosure is that of providing a reliable method for measuring an effective incident radiation on a suspended span of electrically conductive cable.

Accordingly, in at least one embodiment, this method of measuring an effective incident radiation on a suspended span of electrically conductive cable comprises the steps of measuring a perpendicular wind speed component with respect to the suspended span of electrically conductive cable span using the abovementioned method for measuring a perpendicular wind speed component, measuring an ambient temperature, measuring a temperature of said suspended cable span, and measuring an electric current circulating through said suspended cable span. A convective heat loss rate of said suspended cable span is then calculated as a function of said ambient temperature, said temperature of the suspended cable span and said perpendicular wind speed component. A radiated heat loss rate of said suspended cable span is further calculated as a function of said ambient temperature and said temperature of the suspended cable span, and a resistive heat gain rate is calculated as a function of said electric current and said temperature of the suspended cable span. Said effective incident radiation is then calculated as a function of said convective heat loss rate, radiated heat loss rate and resistive heat gain rate. In particular, said effective incident radiation may be calculated as the sum of said convective heat loss rate and radiated heat loss rate minus said resistive heat gain rate, thus reflecting the thermal balance of the cable span. Furthermore, since the sag of the cable span depends on the thermal dilatation of the cable and thus of its temperature, said temperature of the cable span may be measured by measuring a sag of the suspended cable span, and calculating the temperature of the suspended cable span as a function of said sag, thus providing a measurement representative of a mean temperature over the entire cable span. The sag may be measured, for instance, using the method disclosed in abovementioned U.S. Pat. No. 8,184,015, which has been incorporated by reference.

By measuring both the perpendicular wind speed component and the effective incident radiation it also becomes possible to determine a maximum allowable current rating for a suspended span of electrically conductive cable. Such a maximum allowable current rating or ampacity is primarily limited by the need to maintain at least a minimum safety clearance around the sagging suspended span of electrically conductive cable to prevent arcing. Since the electric current will increase the temperature and thus the sag of the cable through the Joule effect, and said sag will normally decrease the clearance around, and in particular below the suspended cable span, the maximum allowable current rating will be determined by the thermal balance of the suspended cable span at the maximum allowable sag.

Accordingly, in at least one embodiment, a maximum allowable current rating for a suspended span of electrically conductive cable is determined by determining a maximum allowable sag for said suspended cable span, calculating a maximum allowable temperature for said suspended cable span as a function of said maximum allowable sag, measuring an effective incident radiation on said suspended cable span, together with a perpendicular wind speed component and an ambient temperature, and using the abovementioned method for this purpose. A convective heat loss rate of said suspended cable span for said maximum allowable temperature of the suspended cable span with said maximum allowable temperature of the suspended cable span and said perpendicular wind speed component is then calculated, as well as a radiated heat loss rate of said suspended cable span for said maximum allowable temperature with said ambient temperature, and an electric resistance of said suspended cable span at said maximum allowable temperature. The maximum allowable current rating is then calculated as a function of said effective incident radiation and said convective heat loss rate, radiated heat loss rate and resistance at said maximum allowable temperature.

Another object of the present disclosure is that of providing a method for supplying electric power over a power line comprising a suspended span of electrically conductive cable wherein said electric power is maximized while maintaining a minimum safety clearance around said suspended cable span. Accordingly, in at least one embodiment, a maximum allowable current rating for said suspended span of electrically conductive cable is determined according to the abovementioned method for this purpose, and a current passing through said power line is limited at or below said maximum allowable current rating. If the power line comprises a plurality of successive suspended cable spans, a maximum allowable current rating may be calculated for each one of these suspended cable spans, or for a subset of these suspended cable spans which has previously been identified as critical, and the current passing through said power line may then be limited at or below the lowest of these maximum allowable current ratings.

The present disclosure also relates to computer programs and memory carriers containing computer-readable instruction sets for implementing these methods. In particular, the present disclosure relates to a computer program for implementing the abovementioned method for measuring a perpendicular wind speed component with respect to a suspended cable span when executed by a data processing device connected to a sensor set for sensing the motion of at least one point of said cable span over a time interval, as well as to a memory carrier containing a computer-readable instruction set for implementing this method when executed by a data processing device connected to a sensor set for sensing the motion of at least one point of said cable span over a time interval.

The present disclosure also relates to a system for measuring a perpendicular wind speed component with respect to a span of cable hanging between two distant supports, which comprises a sensor set for sensing the motion of at least one point of said cable span over a time interval and a data processing unit connected to said sensor set and configured to implement the abovementioned method for measuring a perpendicular wind speed component with respect to a suspended cable span.

The above summary of some example embodiments is not intended to describe each disclosed embodiment or every implementation of the invention. In particular, selected features of any illustrative embodiment within this specification may be incorporated into an additional embodiment unless clearly stated to the contrary.

BRIEF DESCRIPTION OF THE DRAWINGS

The invention may be more completely understood in consideration of the following detailed description of embodiments in connection with the accompanying drawings, in which.

Figure 1:
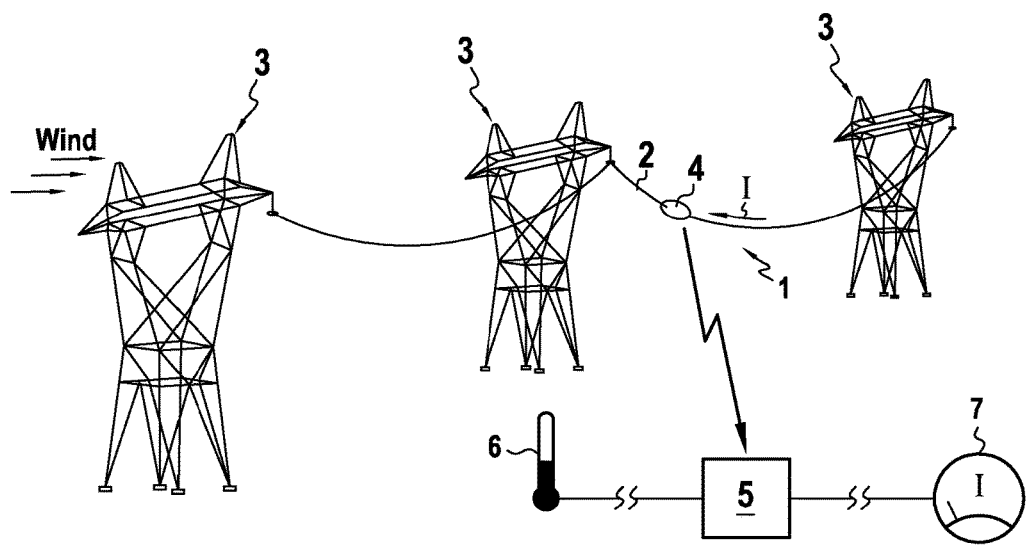
FIG. 1 is a schematic view of a power line with a plurality of spans of suspended electrically conductive cable and a system for measuring a perpendicular wind speed component with respect to one of these spans, as well as the effective incident radiation on this span and a maximum allowable current rating for this span.

While the invention is amenable to various modifications and alternative forms, specifics thereof have been shown by way of example in the drawings and will be described in detail. It should be understood, however, that the intention is not to limit aspects of the invention to the particular embodiments described. On the contrary, the intention is to cover all modifications, equivalents, and alternatives falling within the scope of the invention.

DETAILED DESCRIPTION

For the following defined terms, these definitions shall be applied, unless a different definition is given in the claims or elsewhere in this specification.

All numeric values are herein assumed to be preceded by the term "about", whether or not explicitly indicated. The term "about" generally refers to a range of numbers that one of skill in the art would consider equivalent to the recited value (i.e. having the same function or result). In many instances, the term "about" may be indicative as including numbers that are rounded to the nearest significant figure.

Any recitation of numerical ranges by endpoints includes all numbers within that range (e.g., 1 to 5 includes a.o. 1, 4/3, 1.5, 2, e, 2.75, 3, n, 3.80, 4, and 5).

Although some suitable dimension ranges and/or values pertaining to various components, features and/or specifications are disclosed, one of skill in the art, incited by the present disclosure, would understand desired dimensions, ranges and/or values may deviate from those expressly disclosed.

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

The present disclosure relates to measuring a perpendicular wind speed component with respect to a suspended cable span. This, as we will see, has a specific application in providing a maximum allowable current rating, also known as "ampacity", for such a suspended cable span or for an electric power line comprising such a suspended cable span. It may nevertheless have other applications in fields not directly related to electric power transmission.

FIG. 1 illustrates schematically an overhead power line 1 comprising a plurality of successive suspended spans 2 of electrically conductive cable supported by pylons 3 through suspension chains. On each critical suspended cable span 2 is clamped an autonomous device 4, as disclosed for instance in abovementioned U.S. Pat. No. 8,184,015, comprising an accelerometer set suitable for monitoring motion in at least two axes perpendicularly to the cable and a transmitter for transmitting motion data obtained by this accelerometer set to a remote data processing unit 5. The autonomous device 4 may be inductively powered by the electric current I flowing through the power line 1. The illustrated system also comprises at least one ambient temperature sensor 6 and one electric current sensor 7 also connected to the remote data processing unit 5. The ambient temperature sensor 6 may be integrated within the autonomous device 4 or located within a general vicinity of the power line 1. As the ambient temperature $T_a$ is comparatively stable over time, distance or altitude, a measurement performed even several kilometres away from the overhead power line 1 may be adequate. The electric current sensor 7 may also be embedded within the autonomous device 4, although conventional electric current sensors remotely installed in power substations and connected to the data processing unit 5 over the existing data transmission infrastructure of a Transmission System Operator in charge of the power line 1 may also be used.

Figure 2:
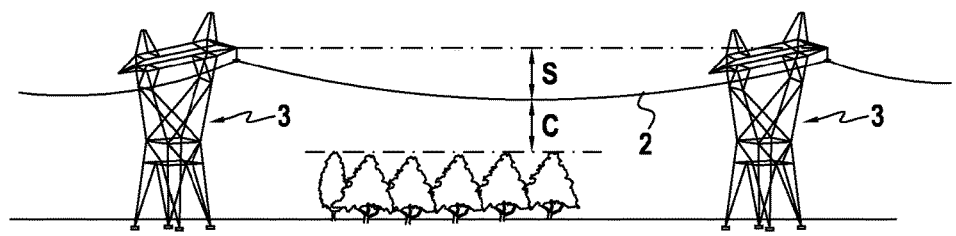
FIG. 2 is a side view of a span of the power line of FIG. 1.

Each span 2 has a sag S which will increase with the temperature $T_c$ of the cable, as thermal dilatation increases the length of cable between successive pylons 3. Increasing sag of a suspended cable span generally decreases the clearance C of the cable with respect to the ground or any aboveground obstacles, such as trees or buildings, as seen schematically on FIG. 2. It is however often required to maintain at least a critical minimum clearance $C_{min}$ in order to prevent arcing from a suspended cable span of an overhead high-voltage power line.

The temperature $T_c$ of the suspended cable span 2, and hence its sag S and clearance C, is governed by the thermal balance between the suspended cable span 2 and its environment. On one hand, the suspended cable span 2 is heated up by the effective incident radiation of the Sun and the albedo around the cable span 2 as well as by resistive heating caused by the electric current I, through the Joule effect, by the electric current I flowing through the cable. On the other hand, the suspended cable span is cooled down by radiative as well as convective cooling. In a steady state, these heat gains and heat losses even each other out so that, according to the thermal equilibrium equation described in abovementioned IEEE Standard 738-2006:

$$q_s + R(T_c)I^2 = q_c + q_r$$

wherein $q_s$ is the heat gain rate per unit of length of the cable caused by the effective incident radiation, $R(T_c)$ the electric resistance per unit of length of the cable at the temperature $T_c$, $q_c$ the convective heat loss rate per unit of length, and $q_r$ the radiative heat loss rate per unit of length. Each one of said heat gain and loss rates in this expression is expressed in W/m.

The radiative heat loss rate $q_r$ can be calculated, according to the Stefan-Boltzmann equation, as:

$$q_r = \pi d \sigma \varepsilon (T_c^4 - T_a^4)$$

wherein $T_a$ is the ambient temperature (in Kelvin), $\varepsilon$ a dimensionless emissivity coefficient of the cable surface, between 0 and 1 and normally between 0.7 and 0.9, and $\sigma$ the Stefan-Boltzmann constant, that is, $5.670400 \cdot 10^{-8}$ J$s^{-1}$ m$^{-2}$ K$^{-4}$.

For forced convection, that is, convection assisted by a relative wind with respect to the suspended cable span, the convective heat loss rate $q_c$ can for example be estimated according to the following equations:

$$q_{c1} = \left[1.01 + 0.0372 \left(\frac{10^3 d \rho_f v}{\mu_f}\right)^{0.52}\right] k_f (T_c - T_a)$$

$$q_{c2} = 0.0119 \left(\frac{10^3 d \rho_f v}{\mu_f}\right)^{0.6} k_f (T_c - T_a)$$

wherein the convective heat loss rate $q_c$, can be estimated as whichever is the largest among these two estimates $q_{c1}$ and $q_{c2}$. In these equations, $\mu_f$ represents the dynamic viscosity of air (in Pa·s), which can be estimated at $1.84 \cdot 10^{-5}$ Pa·s at $T_a$=298 K, and $k_f$ represents the thermal conductivity of air (in W·m$^{-1}$·K$^{-1}$), which can be estimated at 0.0261 W·m$^{-1}$·K$^{-1}$ at $T_a$=298 K. $v$ represents an effective wind speed with respect to the cable.

The natural convective heat loss rate without wind can also be estimated on the basis of equations which have been presented in abovementioned CIGRE Technical Brochure No. 207 and IEEE Standard 738-2006. However, wind will normally be present, usually above a threshold of a few tenths of meters per second, typically around 0.5 m/s, and will have a significant impact in the thermal balance of the suspended cable span.

Consequently, knowing said effective wind speed $v$, the ambient temperature $T_a$, the electric current I, the temperature of the cable $T_c$ and several properties of the cable, such as its cross-sectional diameter d, its emissivity $\varepsilon$, and its electric resistance $R(T_c)$ at said temperature $T_c$, it is possible to calculate the resistive heat gain rate $R(T_c)I^2$, the convective heat loss rate $q_c$, and radiative heat loss rate $q_r$. Assuming a steady state, it is then possible to calculate the effective incident radiation per unit of length $q_s$, following the abovementioned thermal equilibrium equation, as:

$$q_s = q_c + q_r - R(T_c)I^2$$

As stated above, the sag S is a known function of the temperature $T_c$ of the suspended cable span 2. It is thus also possible to evaluate this temperature $T_c$ through the sag S. There are various methods for measuring this sag S which are available to the skilled person. For example, in abovementioned U.S. Pat. No. 8,184,015 a method was disclosed for measuring this sag S by analyzing a motion sensed by the autonomous device 4.

By the presently disclosed method, it is also possible to measure a perpendicular wind speed component u on the basis of the motion of at least one point of the suspended cable span 2, as sensed by such an autonomous device 4 or any alternative means available to the skilled person, such as for example a remote camera with a target on the suspended cable span 2. This perpendicular wind speed component u is very close to said effective wind speed $v$ for winds blowing with angles ranging between 45° and 90° to the direction of the to the suspended cable span 2. Using the wind speed perpendicular component u as the effective wind speed $v$ for calculating the convective heat loss rate $q_c$ thus yields a very good estimate of the convective heat loss rate $q_c$ in that case. For angles ranging from 0° to 45°, using the wind speed perpendicular component u as the effective wind speed $v$ for calculating the convective heat loss rate $q_c$ yields a low estimate of the latter, which will nevertheless be useful for calculating a conservative maximum allowable current rating.

Figure 3:
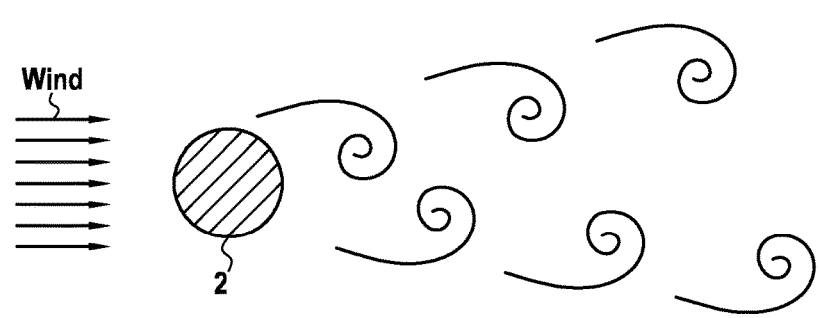
FIG. 3 illustrates the von Karman vortex trail behind a windblown suspended cable.

Wind blowing perpendicularly to a suspended cable span can generate a series of trailing von Karman vortices behind the suspended cable span 2, as shown schematically in FIG. 3. Because these vortices are generated alternatively above and below the suspended cable span 2, they can provoke a vibration of the suspended cable span 2. Such a vibration is known as an Aeolian vibration, and is usually characterized by a high ratio of vertical to horizontal motion (at least 5 to 1, usually around 10 to 1), and by frequencies f in a frequency range not higher than 150 Hz. According to the general knowledge in the field of fluid mechanics, as expressed for instance by R. D. Blevins in "Flow Induced Vibration", 2$^{nd}$ edition, published by Van Nostrand Reinhold in 1990 in New York, and by Simiu and Scanlan in abovementioned "Wind effects on structures", the power spectral density peaks of such vibrations, usually comprised between 3 and 100 Hz and most usually between 2 and 40 Hz, are observed at frequencies linked by the Strouhal equation to the wind speed and the conductor diameter, so that a given wind speed will generate vibrations in a close range of frequencies.

Aeolian vibration is a key source of material fatigue in suspended cables, and has consequently been studied in detail in such works as abovementioned EPRI Transmission Line Reference book "Wind induced conductor motion". Therein, Aeolian vibrations have been linked to a lock-in of the von Karman vortex shedding frequency with one mode of vibration of the cable, or a few modes of vibrations of the cable in a very narrow frequency range. This at least one frequency is the dominant mode of energy conversion from the wind to the vibration over the entire suspended cable span 2. It is thus representative of the dominant mean perpendicular wind speed component u to be considered for calculating the forced convective heat loss rate $q_c$ over the entire suspended cable span.

As disclosed by B. Godard, S. Guerard, and J.-L. Lilien in abovementioned articles "Original Real-time Observations of Aeolian Vibrations on Power-Line Conductors" and "Aeolian Vibrations on Power-Line Conductors, Evaluation of Actual Self Damping", the observed frequencies thus reflect the actual perpendicular wind speed component with respect to the suspended cable through said Strouhal equation:

$$Str = \frac{f \cdot d}{u}$$

The perpendicular wind speed component u may thus be calculated on the basis of vibration frequency analysis, in particular at very low wind speeds, below about 7 m/s, and most preferably below 3 m/s, which may be particularly significant for the determination of a maximum allowable current rating for the power line.

However, at higher wind speeds, typically above a few meters per second, the motion of the suspended cable is dominated by buffeting rather than by Aeolian vibrations. Such a buffeting motion pattern mainly relates to random and irregular effects due to variations of wind speed both in module and direction along the length of the suspended cable span. Such variations do not allow the formation of quasi-stationary vibrations like the Aeolian vibrations. Instead, they cause a random excitation of the suspended cable over a broad range of frequencies. The difference between these two motion modes is illustrated by the graphs in FIGS. 4, 5A, 5B, 6A, 6B, 7A and 7C.

These graphs are based on acceleration data measured by an autonomous device, as disclosed in U.S. Pat. No. 8,184,015, clamped to at least one point of a suspended cable span and comprising a three-axis accelerometer assembly with a resolution at or below 100 micro-G and adapted to sense vibrational motion in a frequency range from 0 to about 100 Hz. These acceleration data have been sampled in successive periods of 5 minutes, and subjected to frequency analysis to provide the graph of FIG. 4, which plots the frequencies observed between 0 and 12.5 Hz in the transverse motion of a suspended cable in these successive frequency analysis periods within a 24-hour midnight-to-midnight time interval. Although in the example illustrated in FIG. 4 the sampling periods have a duration of 5 minutes, periods of different duration, usually of a few minutes, and preferably between 2 and 10 minutes may alternatively be used.

Figure 4:
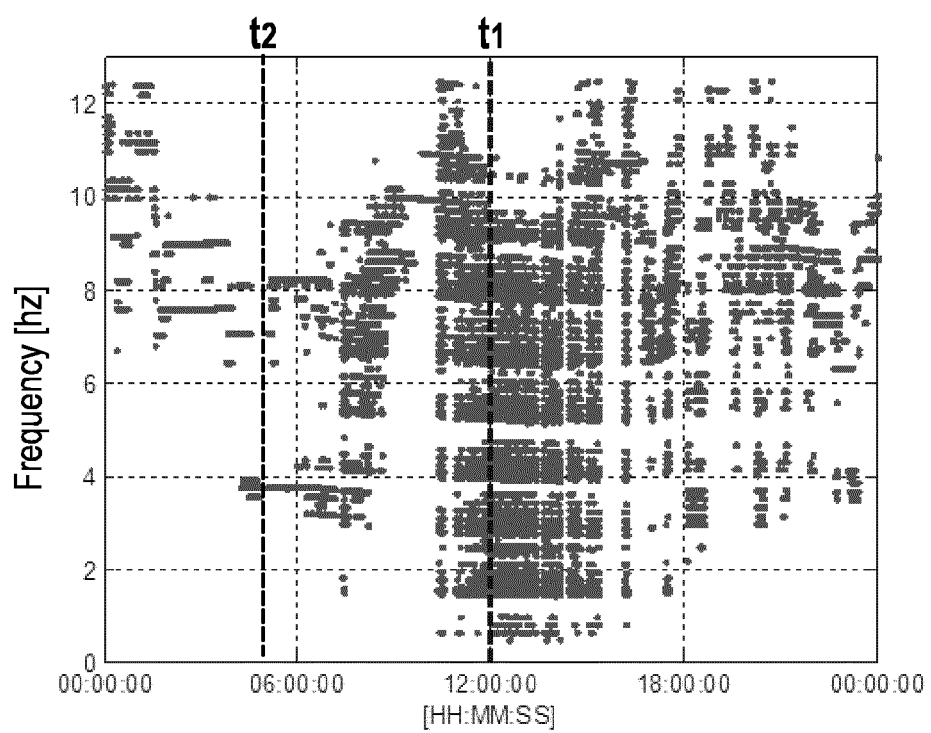
FIG. 4 is a graph showing the vibration frequencies of a windblown suspended cable span over successive frequency analysis periods during a 24-hour period.
Figure 5A:
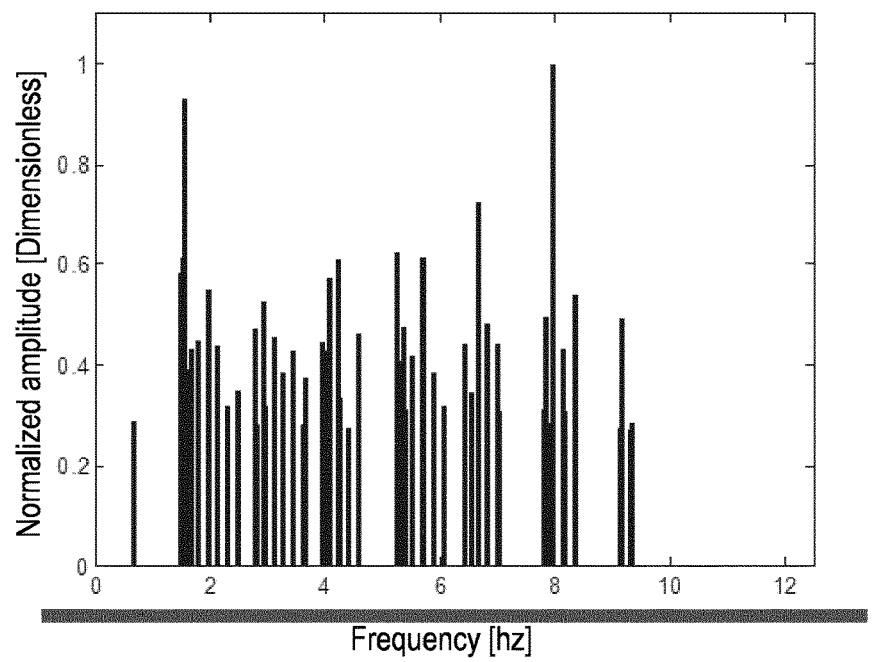
FIG. 5A is a graph showing the vibration frequencies of FIG. 4 at 12:00:00 with the corresponding acceleration amplitudes.
Figure 6A:
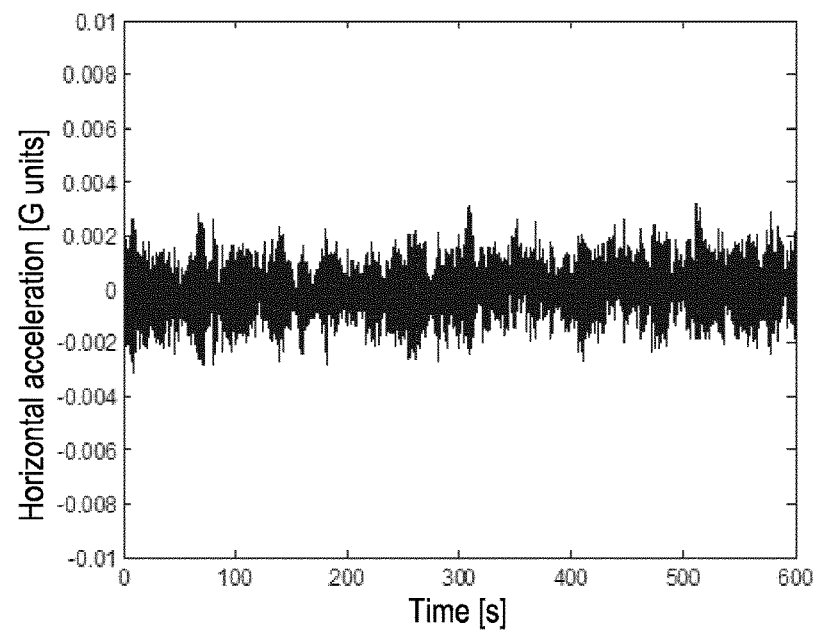
FIGS. 6A and 6B are graphs illustrating, respectively, the horizontal and vertical motion of the suspended cable span during the frequency analysis period of FIG. 5A.
Figure 6B:
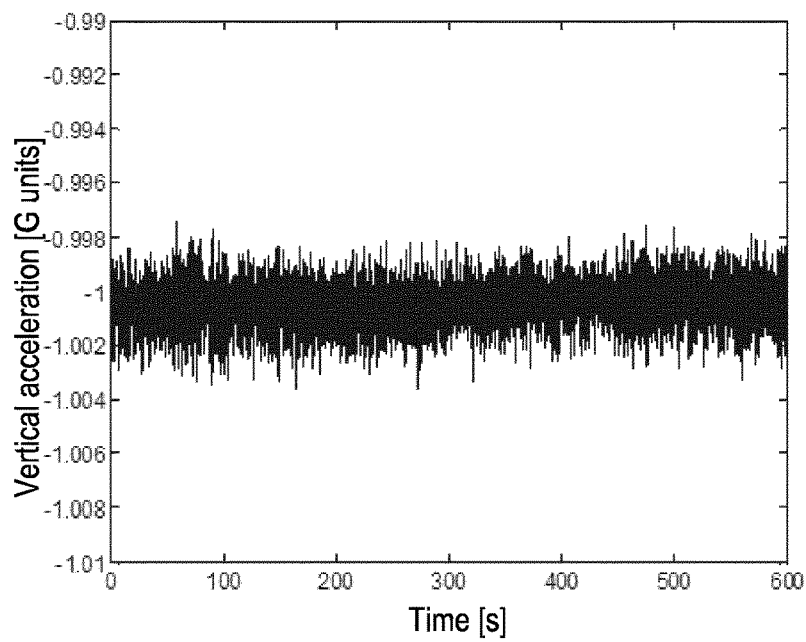

The different types of wind-induced motion of the suspended cable are clearly visible in the graph of FIG. 4. So, for instance, at around $t_1$=12:00:00, the cable oscillates with a broad frequency spectrum corresponding to a buffeting or "Type I" motion. These frequencies, and the corresponding vibration amplitudes, are shown in FIG. 5A. A large number of vibration modes are present there due to the spatiotemporal non-uniformity of wind. FIGS. 6A and 6B illustrate, respectively, the typical evolution of the horizontal and vertical transversal accelerations of the cable during a period of 10 minutes of such a buffeting motion. The vertical and horizontal transversal accelerations are clearly within the same order of magnitude.

Figure 5B:
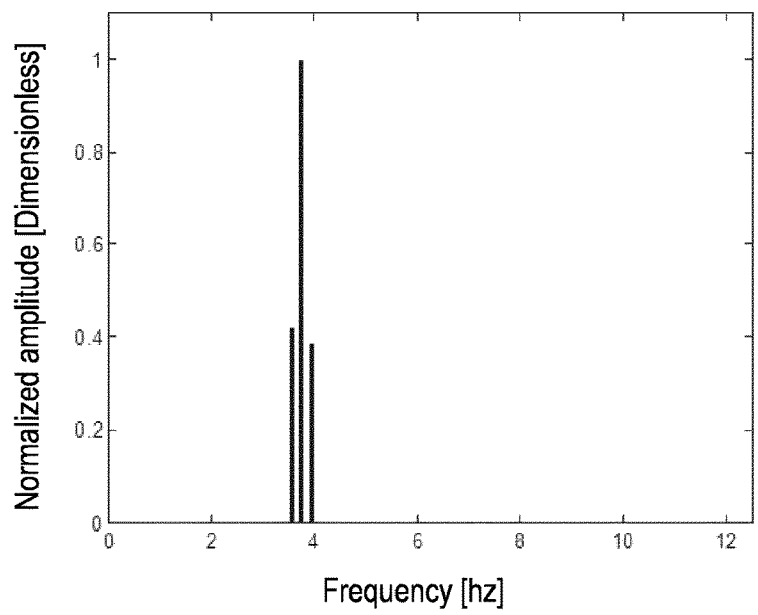
FIG. 5B is a graph showing the vibration frequencies of FIG. 4 at 04:30:00 with the corresponding acceleration amplitudes.
Figure 7A:
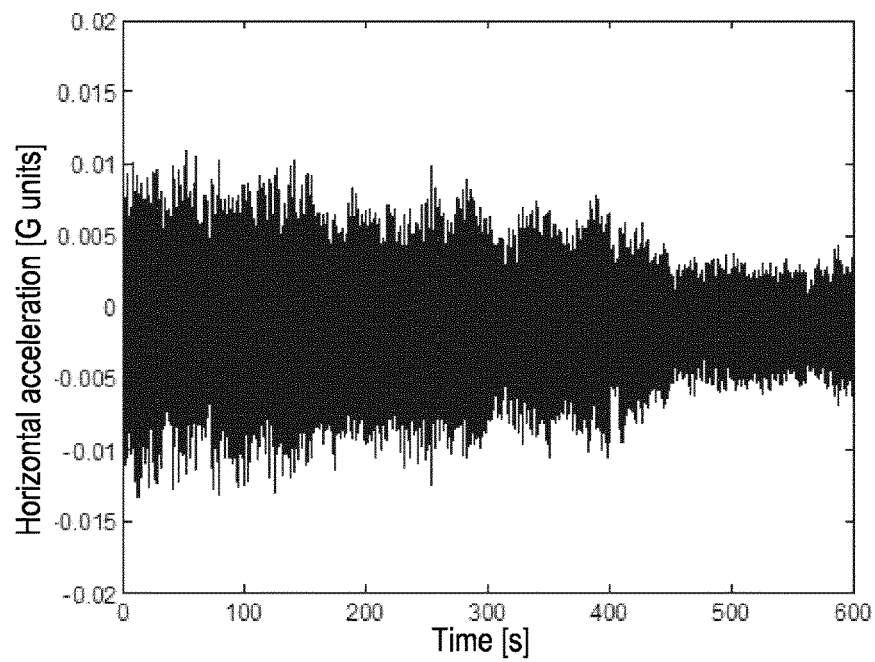
FIGS. 7A and 7B are graphs illustrating, respectively, the horizontal and vertical motion of the suspended cable span during the frequency analysis period of FIG. 5B.
Figure 7B:
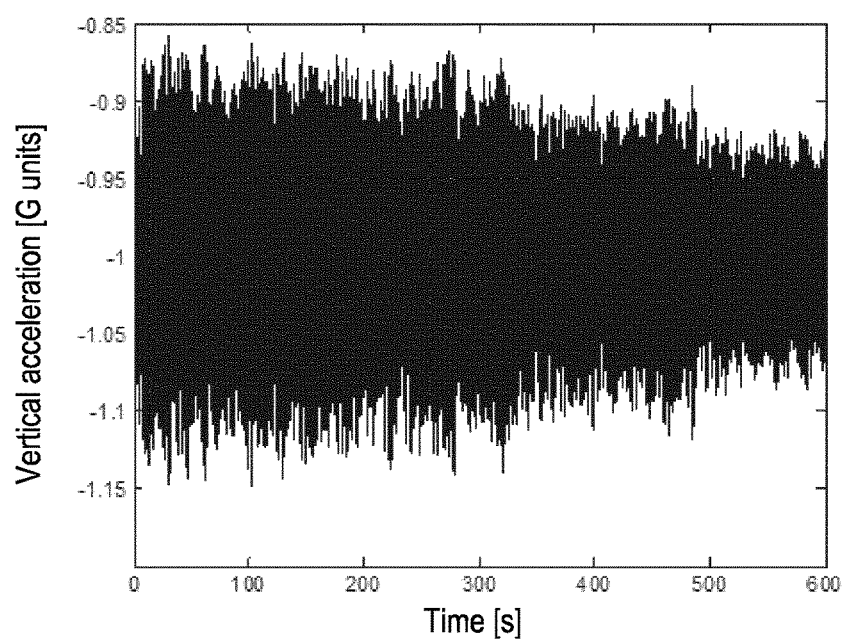

On the other hand, at around $t_2$=04:30:00, the vibration frequencies are shown to be within a much narrower spectrum corresponding to an Aeolian vibration or "Type II" motion. As shown in FIG. 5B, illustrating these frequencies and the corresponding amplitudes, only three very close frequencies are detected within this frequency analysis period, centered around a very dominant mode of vibration. Moreover, as illustrated in FIGS. 7A and 7B, the vertical accelerations shown there as oscillations around the acceleration of gravity, are over one order of magnitude stronger than the horizontal transversal accelerations. These features clearly characterize Aeolian vibrations.

Between those two motion types of buffeting and Aeolian vibration, the windblown suspended cable span will also go through transitional periods during which it will present a transitional or "Type III" motion. During the transition from the buffeting Type I motion to the Aeolian vibration Type II motion, the amplitude of vibrations with frequencies below those corresponding to the Aeolian vibration according to the Strouhal equation will decrease, and the Aeolian vibration will build up. When the Aeolian vibration is fully built up, the suspended cable vibrates with a frequency corresponding to the wind velocity given by Strouhal equation. The vibration frequency does not subsequently change in response to small wind speed changes, owing to the lock-in phenomenon as described by abovementioned EPRI Transmission Line Reference book "Wind induced conductor motion" and by R. D. Blevins in "Flow Induced Vibration". At first, only the amplitude of the Aeolian vibration will decrease, without noticeable changes in the frequency, but if the wind speed changes beyond a certain threshold, the Aeolian vibration will die, transitioning to the buffeting Type I motion, or a new Aeolian vibration mode with a different main frequency will build up. Such a transition period can last a few minutes, typically between about 2 and about 5 minutes. It can be determined by observing the evolution of vibration amplitudes at excited frequencies during a given lapse of time.

Figure 8:
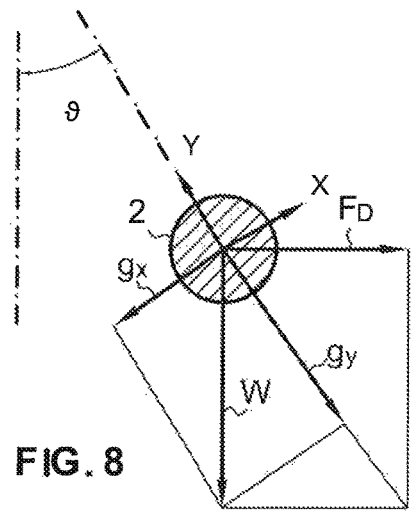
FIG. 8 is a schematic cross-sectional view of a transversally swinging suspended cable span.

Although, in the absence of Aeolian vibrations, it is not possible to measure the wind speed through frequency analysis using the Strouhal equation, other means are available. In particular, the aerodynamic drag $F_D$ on the suspended cable forces a transverse swing of the suspended cable span 2 between successive pylons 3. As shown in FIG. 8, assuming a steady state, the tangent of the transverse swing angle θ equals the ratio between this aerodynamic drag and the weight W of the suspended cable span 2:

$$\tan\vartheta = \frac{F_D}{W} = \frac{\rho_f c_D d u^2}{2 g \rho_c}$$

Therefore, the perpendicular wind speed component u may also be calculated on the basis of the transverse swing angle ϑ. Since the tangent of the transverse swing angle ϑ will be proportional to the square of the perpendicular wind speed component u, the accuracy of this measure will increase at higher wind speeds.

Figure 9:
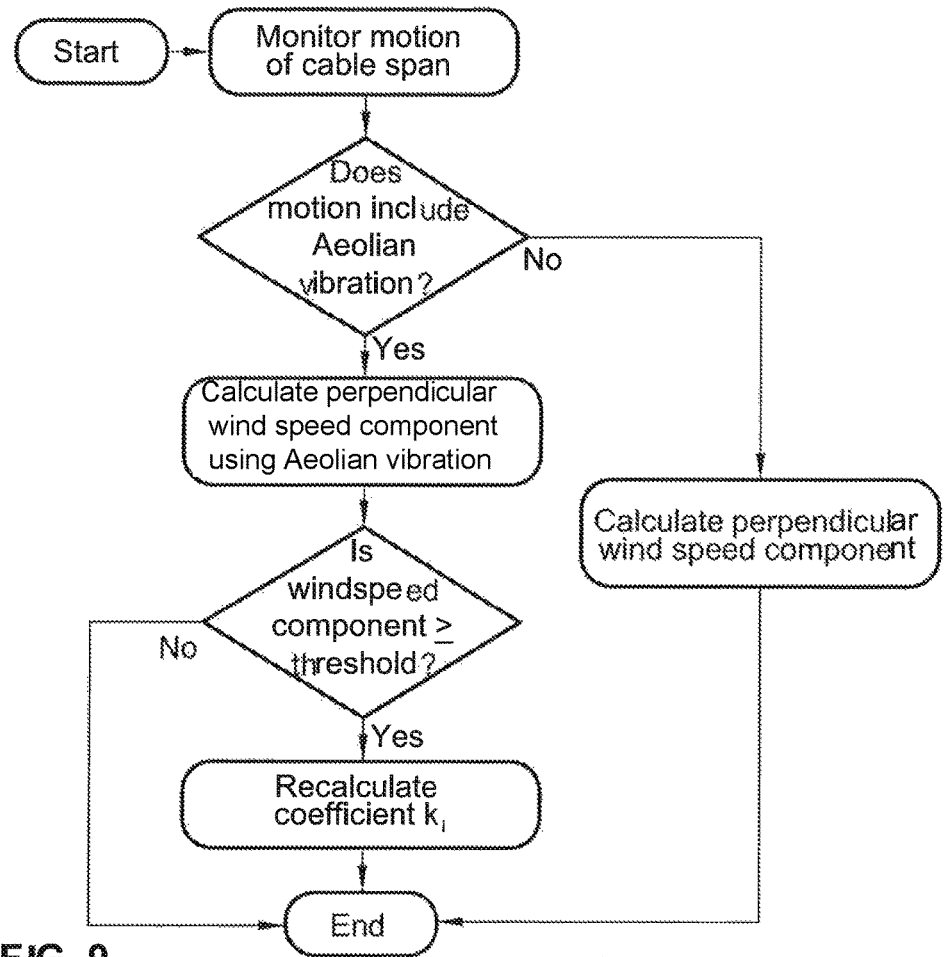
FIG. 9 is a flowchart of a method for measuring a perpendicular wind speed component with respect to the suspended cable span.

Consequently, the present disclosure aims to provide a method for measuring the perpendicular wind speed component u with respect to the suspended cable span 2 by complementarily using an Aeolian vibration frequency f or a transverse swing angle ϑ of the suspended cable span 2 as a measure of this perpendicular wind speed component u. This method is schematically illustrated in the flowchart of FIG. 9.

In a first step S101 of this method, the motion of at least one point of said suspended cable span 2 is monitored over a time interval. This step may be carried out using the abovementioned autonomous device 4, which is inductively powered by the electric current flowing through the suspended cable span 2. The acceleration data obtained by this autonomous device 4 may be processed on site, or transmitted to a remote location through a transmitter also integrated in the autonomous device 4. Alternative means may nevertheless be considered by the skilled person in order to monitor this motion.

In the next step S102, it is determined whether this motion comprises Aeolian vibrations, on the basis of the data obtained by monitoring the motion of the suspended cable span 2. An Aeolian vibration is characterized by being a nearly stationary process in the frequency domain, but not necessarily in the amplitude domain. Therefore, in order to determine the presence of Aeolian vibrations, a correlation between the frequency content of several successive analysis periods within said time interval is checked. Each frequency analysis period may have a duration of a few minutes, typically between 2 and 5 minutes. The positive correlation coefficient between the frequencies of these successive periods should typically be at least 0.75 and possibly over about 0.9. In other words, Aeolian vibrations are identified when, during a plurality of successive analysis periods there is a very limited number of correlated frequencies, typically about three close frequencies, within a narrow frequency range consistent with the Strouhal equation for the shape and diameter of the suspended cable span 2. For instance, considering a Strouhal number Str of about 0.185 for such cables, and a cross-sectional diameter d of 0.03 m, to detect a perpendicular wind speed component u between 0 m/s and 2 m/s, the range of frequencies to be monitored should be near 0 to 12.3 Hz. Wind speeds below a certain threshold, typically below 0.1 to 0.2 m/s, may not be energetic enough to excite Aeolian vibration, thus setting a lower limit for this frequency range. For instance, if the threshold lies at a wind speed of 0.2 m/s, the lower limit of the frequency range for this same cable would accordingly be about 1.2 Hz.

The ratio of vertical to horizontal motion of the suspended cable span 2 may also be used to detect Aeolian vibration, complementarily or alternatively to the analysis of the vibration frequencies. As seen in FIGS. 6A and 6B, during buffeting, wind gusts generate a motion in both vertical and horizontal transversal directions, whereas, as shown in FIGS. 7A and 7B, Aeolian vibrations are mainly perpendicular to the wind flow, and their amplitude is thus significantly higher in a vertical than in a horizontal direction, since the wind typically flows in a near-horizontal direction.

If in step S102 the motion of the suspended cable span 2 is not determined to comprise an Aeolian vibration, in the next step S103 the perpendicular wind speed component u is calculated as a function $u(\vartheta)$ of the transverse swing angle $\vartheta$, according to the equation:

$$u(\vartheta)=\sqrt{k_i g \tan\vartheta}$$

wherein the predetermined coefficient $k_i$ may have been at least initially calculated using the equation:

$$k_i = 2\frac{\rho_c}{\rho_f c_D d}$$

For example, assuming an air density $\rho_f$ of 1.2 kg/m$^3$ at 293 K and, for the suspended cable span 2, a linear density $\rho_c$ of 1 kg/m, a drag coefficient $c_D$ of 1 and a diameter d of 0.03 m, the value of $k_i$ can be estimated as being 55 m.

The transverse swing angle $\vartheta$ may itself be measured using the same autonomous device 4, as disclosed in U.S. Pat. No. 8,184,015, clamped to at least one point of the suspended cable span 2 and comprising a three-axis accelerometer assembly with a resolution at or below 100 micro-G which can be used for sensing the Aeolian vibrations. If the accelerometer assembly has a reference system which is fixed to the cable, when the cable presents such a transverse swing angle $\vartheta$, the accelerometers will sense two separate, static components $g_x$, $g_x$ of the acceleration of gravity g in the local reference axes X and Y. The ratio between those components will also be equal to tangent of the transverse swing angle $\vartheta$:

$$\tan\vartheta = \frac{g_x}{g_y}$$

or also:

$$\sin\vartheta = \frac{g_x}{g}$$

While the individual accelerometers in the accelerometer set of the autonomous device 4 may be installed with an angular offset with respect to this local reference system X-Y, this offset may be easily calculated, for example using acceleration data from periods of vertical motion with small or very small transversal acceleration or during Aeolian vibrations.

In real cases, wind gusts induce a dynamic transversal motion of the suspended cable span 2 and the acceleration values measured by the accelerometer set in the transversal plane can change rapidly. A mean value of each measured transversal acceleration components is calculated to evaluate a mean wind speed acting on the suspended cable span 2. Those mean values may be calculated on the basis of sampling periods with durations ranging from about 5 to 20 minutes, most preferably around 10 minutes.

If however the motion of the suspended cable span 2 is determined in step S102 to comprise an Aeolian vibration, the perpendicular wind speed component u is calculated on the basis of a frequency of this Aeolian vibration in step S104. For a given cylinder diameter and given fluid velocity, the shedding frequency of the flow is given by the Strouhal equation. However, for a real suspended cable span, this is complicated both by the fact that the suspended cable span 2 does not behave as a rigid cylinder and by variations of the wind speed not only in time but also along the suspended cable span 2. Consequently, Aeolian vibrations may simultaneously be excited with a plurality of close frequencies and beat concurrently, as shown in FIG. 5B. In order to calculate the perpendicular wind speed component u, the frequency f of the Aeolian vibration with the highest normalized motion amplitude may be selected. Using then the Strouhal equation, the perpendicular wind speed component u may be calculated as a function u(f) of this frequency f as follows:

$$u(f) = \frac{f \cdot d}{Str}$$

In a subsequent step S105, it is then determined whether this perpendicular wind speed component u calculated as a function u(f) of the Aeolian vibration frequency f reaches a minimum threshold $u_r$ for recalibrating abovementioned predetermined coefficient $k_i$. If this threshold is reached, said coefficient $k_i$ is recalculated in step S106 according to the equation:

$$k_i = \frac{[u(f)]^2}{g \tan\vartheta}$$

Alternatively, however, the threshold in step S105 may relate to the transverse swing angle $\vartheta$, rather than to the perpendicular wind speed component u calculated as a function u(f) of the Aeolian vibration frequency f.

Figure 10:
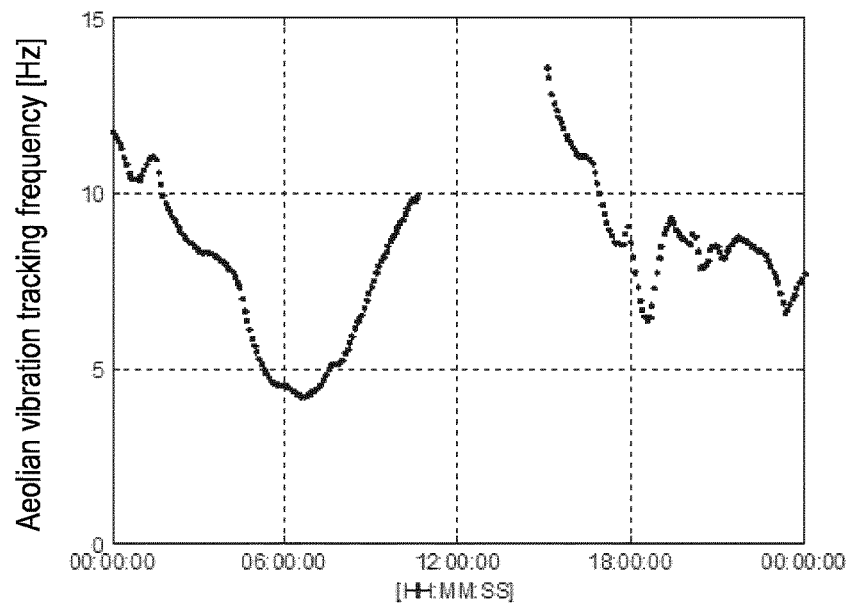
FIG. 10 is a graph illustrating the evolution of the perpendicular wind speed component measured as a function of Aeolian vibration frequencies for the example of FIG. 4.
Figure 11:
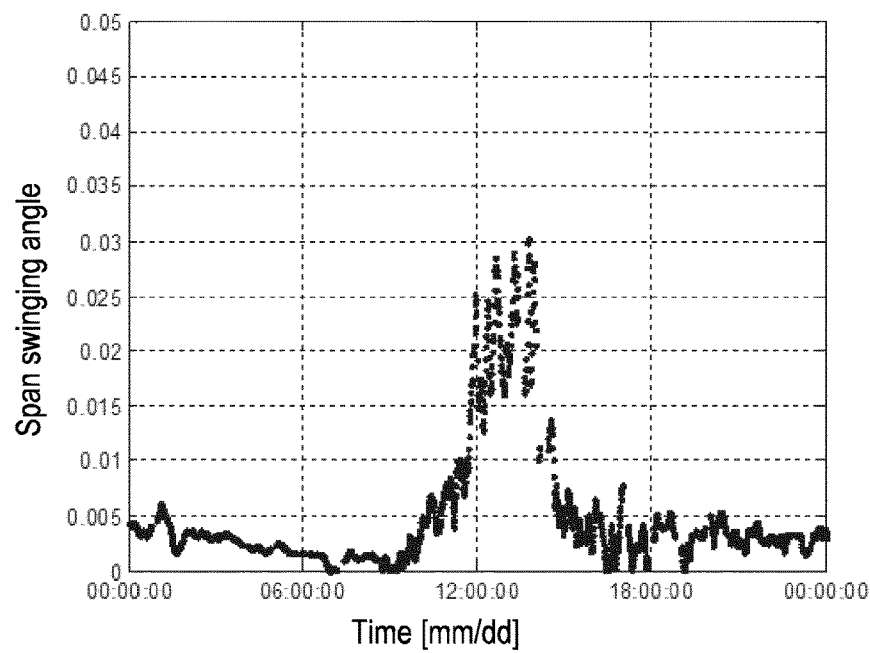
FIG. 11 is a graph illustrating the evolution of the transversal swing angle of the suspended cable span in the example of FIG. 4.
Figure 12:
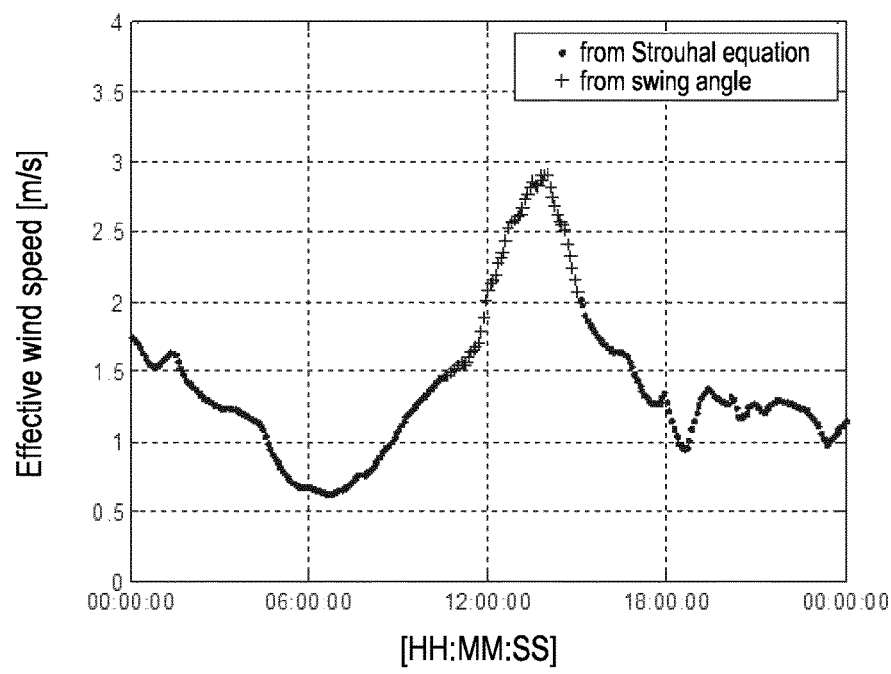
FIG. 12 is a graph combining the results shown in FIG. 10 and those of measuring the perpendicular wind speed component as a function of the transverse swing angles plotted in FIG. 11.

The method thus illustrated in the flowchart of FIG. 9 may be used to measure the perpendicular wind speed component u for each of said frequency analysis periods, either through the Aeolian vibration frequency f, when it is available, or through the transverse swing angle $\vartheta$. FIGS. 10 to 12 illustrate the result of applying this method to the wind-induced motion illustrated in FIG. 4. In particular, FIG. 10 illustrates the evolution of the perpendicular wind speed component u calculated as a function u(f) of the Aeolian vibration frequency f for the frequency analysis periods for which the motion of the suspended cable span 2 is determined to comprise an Aeolian vibration. There is a visible gap around noon, during which the motion was a pure Type I buffeting motion, without Aeolian vibration, for which the perpendicular wind speed component u cannot be calculated as such a function u(f) of the Aeolian vibration frequency f. FIG. 11 shows the measured transverse swing angles $\vartheta$ for each frequency analysis period for the same 24-hour midnight-to-midnight time interval. It is clearly visible in FIG. 11 how the transverse swing angles $\vartheta$ reach particularly high peaks during this gap. Mean values of these transverse swing angles $\vartheta$ for sampling periods of around 10 minutes can be used to calculate the perpendicular wind speed component u as a function of the transverse swing angle $\vartheta$ within this gap without Aeolian vibration. As seen in FIG. 12, these two curves fit and complement each other to provide a gapless measure of the perpendicular wind speed component u.

Figure 13:
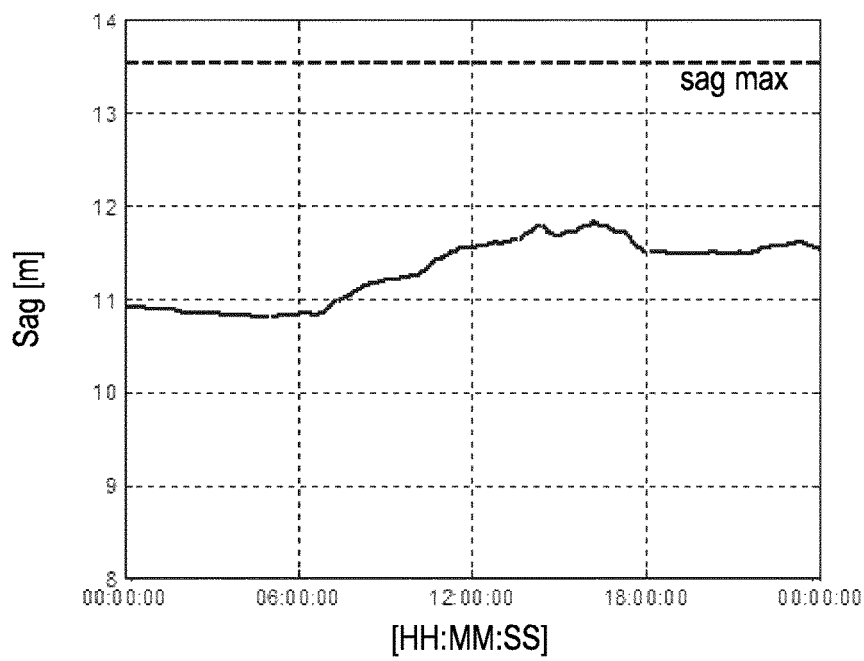
FIG. 13 is a graph illustrating the evolution of the sag of the suspended cable span in the example of FIG. 4.
Figure 14:
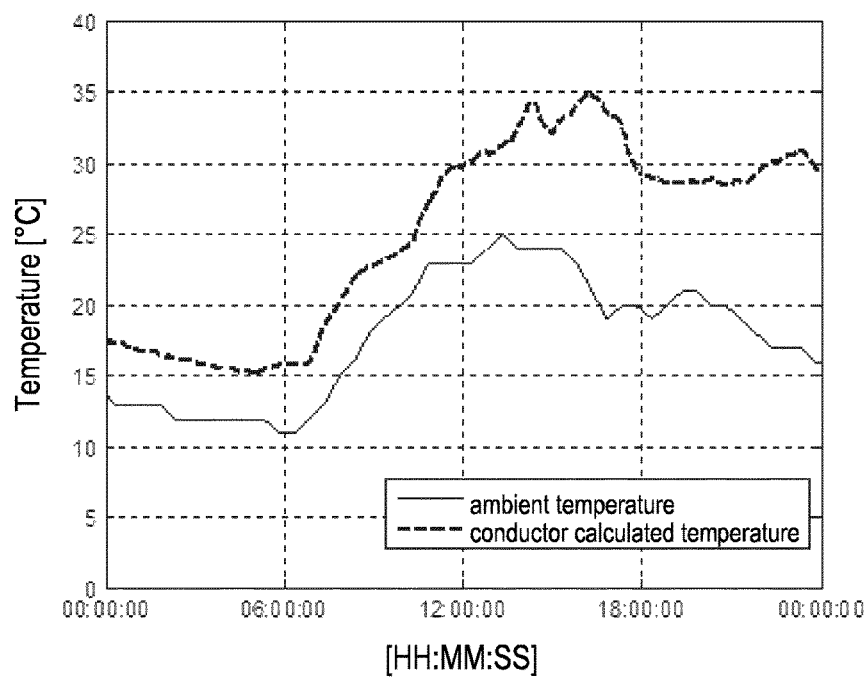
FIG. 14 is a graph illustrating the evolution of the ambient and cable temperatures in the example of FIG. 4.

The data processing unit 5 can thus use this perpendicular wind speed component u for each suspended cable span 2 as the effective wind speed v for estimating the convective heat loss rate $q_c$ of the suspended cable span 2. For this, the data processing unit 5 also receives the ambient temperature $T_a$ measured by the ambient temperature sensor 6, and calculates the cable temperature $T_c$ on the basis of the sag S of the suspended cable span 2, as estimated for example by the method disclosed in U.S. Pat. No. 8,184,015. FIG. 13 illustrates the evolution of the sag S of the suspended cable span 2 during the 24-hour period of the example of FIG. 4, and FIG. 14 illustrates the evolution of the corresponding cable temperature $T_c$ over the same period, together with that of the ambient temperature $T_a$.

Alternatively, however, said cable temperature $T_c$ may be obtained by other means, such as for instance a temperature sensor directly embedded in the autonomous device 4.

Simultaneously, the data processing unit 5 can also calculate the resistive heat gain rate $R(T_c)I^2$ on the basis of the input from the electric current sensor 7 and the radiative heat loss rate $q_r$ on the basis of said ambient and cable temperatures $T_a$, $T_c$. Alternatively to such an electric current sensor 7, the value of the electric current I may be obtained through inputs from the Transmission System Operator (TSO) operating the power line 1.

Assuming a steady state, and following the thermal equilibrium equation, the data processing unit 5 can then calculate the effective incident radiation $q_s$ per unit of length of each critical suspended cable span 2 as:

$$q_s = q_c + q_r - R(T_c)I^2$$

Figure 15:
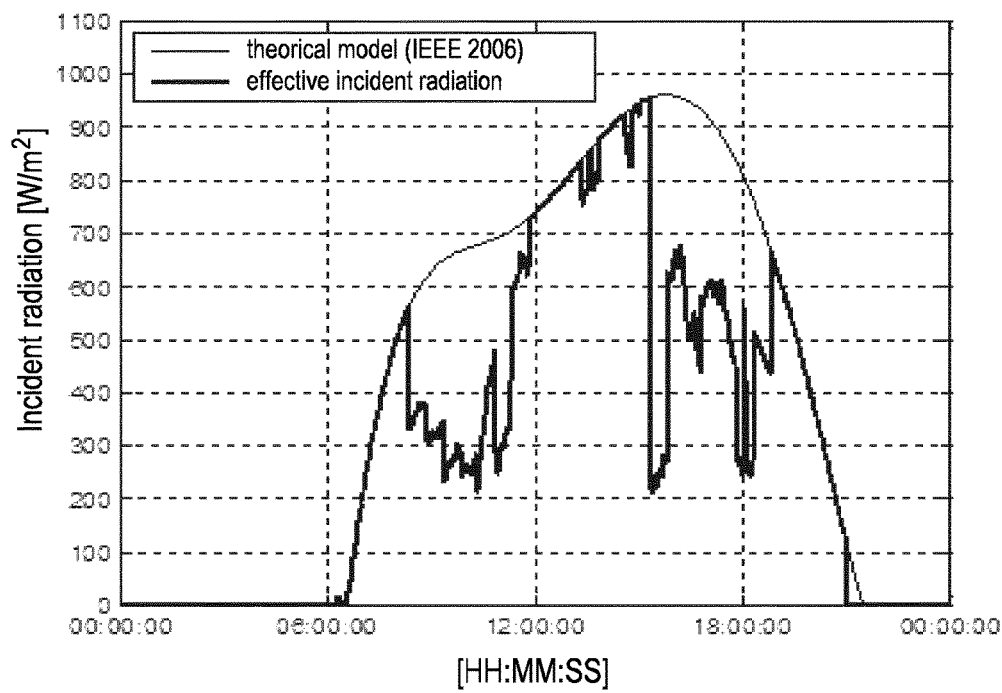
FIG. 15 is a graph illustrating the evolution of the effective incident radiation on the suspended cable span in the example of FIG. 4, calculated according to a method of the present disclosure, compared with the effective incident radiation estimated according to a prior art method.

FIG. 15 illustrates, for the example of FIGS. 4, 13 and 14, the thus estimated evolution of the effective incident radiation $q_s$ during the same 24-hour period, compared with a theoretical model proposed in IEEE Standard 738-2006 wherein the effective incident radiation $q_s$ is calculated on the basis latitude and date. It can be seen how, comparatively this method provides a more accurate measurement of the effective incident radiation $q_s$ which takes account, for instance, of passing clouds obscuring the Sun.

This measurement of the effective incident radiation $q_s$ can then in turn be used by the data processing unit 5, together with the other data, to compute a maximum allowable current rating $I_{max}$, also called ampacity, Dynamic Line Rating (DLR) or Real Time Thermal Rating (RTTR). For this, after determining a maximum allowable sag $S_{max}$ for each suspended cable span 2, a maximum allowable cable temperature $T_{c,max}$ is calculated. This maximum allowable cable temperature $T_{c,max}$ corresponds to the lowest of a cable temperature $T_{c,Smax}$ corresponding to this maximum allowable sag $S_{max}$, or an absolute maximum temperature limit $T_{c,limit}$ at which the structural integrity of the suspended cable span 2 can still be maintained. The radiative and convective heat loss rates $q_{r,max}$, $q_{c,max}$ for the maximum allowable cable temperature $T_{c,max}$ and the measured ambient temperature $T_a$ and perpendicular wind speed component u can then be calculated. Consequently, the maximum allowable current rating $I_{max}$ can be calculated on the basis of the thermal equilibrium equation at said maximum allowable cable temperature $T_{c,max}$, as:

$$I_{max} = \sqrt{\frac{q_{c,max} + q_{r,max} - q_s}{R(T_{c,max})}}$$

wherein $R(T_{c,max})$ is the electric resistance per unit of length of the cable at the temperature $T_{c,max}$.

Figure 16:
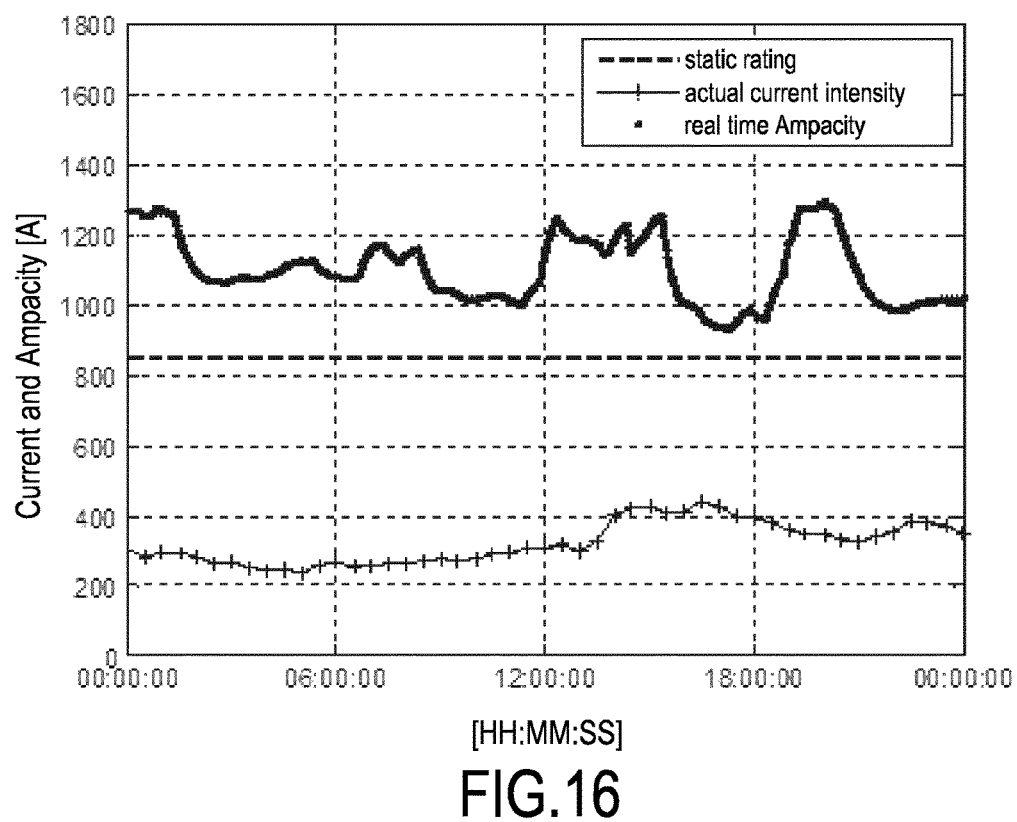
FIG. 16 is a graph illustrating the evolution of the maximum allowable current rating for the example of FIG. 4, calculated according to a method of the present disclosure, compared with a conventional static rating.

FIG. 16 illustrates the evolution of the maximum allowable current rating $I_{max}$ or ampacity calculated using this method for the example of FIGS. 4 and 13 to 15 over the same 24-hour period, compared with the actual current I flowing through the same suspended cable span 2 over the same period, and the static rating for this suspended cable span 2, according to data from the Transmission System Operator. As shown in this graph, this method offers a dynamic current rating that is significantly higher over the entire 24-hour period than the conventional static rating, and this despite the conservative estimate of the convective heat loss rate $q_c$ obtained by using the perpendicular wind speed component u as the effective wind speed v. This can for instance help the integration of highly variable power sources in the power grid, and in particular of renewable power sources such as wind power.

The maximum allowable current rating $I_{max}$ may be calculated for at least each critical suspended cable span 2 of the power line 1. The lowest of these set of maximum allowable current ratings $I_{max}$ for these individual suspended cable spans 2, as the weakest link in the power line 1, may then determine the maximum allowable current rating for the entire power line 2, which will be used to limit the electric current supplied through the power line 1.

The remote data processing unit 5 may be a conventional programmable computer running a computer program implementing these methods. This computer program may be in the shape of a set of instructions stored in a memory carrier. In the present context, "memory carrier" should be understood as meaning any physical medium capable of containing data readable by a reading device for at least a certain period of time. Examples of such memory carriers are magnetic tapes and discs, optical discs (read-only as well as recordable or re-writable), logical circuit memories, such as read-only memory chips, random-access memory chips and flash memory chips, and even more exotic data storage media, such as chemical, biochemical or mechanical memories.

Although in the illustrated embodiment the data processing unit 5 is remote from the autonomous device 4, it could also be completely or partially integrated into one such autonomous device 4, so that at least some of the computing steps of these methods are carried out within the autonomous device 4 itself.

Although in the presently disclosed method, the perpendicular wind speed component u measured through the Aeolian vibration frequency f and/or the transverse swing angle ϑ is specifically used to calculate the effective incident radiation $q_s$ and the maximum allowable current rating $I_{max}$, it can also be used for a broader range of applications, like the determination of a wind dynamic pressure coefficient, or of a maximum swing angle of the suspended cable span 2, values which can then be used to design such power lines.

Those skilled in the art will recognize that the present invention may be manifested in a variety of forms other than the specific embodiments described and contemplated herein. Accordingly, departure in form and detail may be made without departing from the scope of the present invention as described in the appended claims.

The invention claimed is:

1. A method for measuring a perpendicular wind speed component with respect to a suspended cable span, using an autonomous device clamped thereto and remotely connected to a data processing unit, said autonomous device comprising a three-axis accelerometer, wherein said three-axis accelerometer has a resolution equal to or below 100 micro-G, said method comprising the steps:

using the data processing unit to monitor, with the autonomous device comprising the three-axis accelerometer, a motion of at least one point of said suspended cable span in at least two axes perpendicular to the cable over a time interval;

transmitting data related to said monitored motion from the autonomous device to the data processing unit, and successively performing, in the data processing unit, the steps of:

determining whether said monitored motion comprises an Aeolian vibration, the vibration due to von Karman vortices generated alternately above and below the suspended cable span, said monitored motion being determined to comprise an Aeolian vibration if frequency analysis of the motion during a successive series of analysis periods within said time interval reveals vibration frequencies within a predetermined frequency range, with a positive correlation coefficient between the revealed vibration frequencies in said successive analysis periods being above a first predetermined threshold and/or with a ratio between vertical and horizontal vibration components above a second predetermined threshold; and:

if said monitored motion is not determined to comprise an Aeolian vibration, measuring a transverse swing angle of the suspended cable span, from sensing, by said accelerometer, of two separate static components (gx, gy) of the acceleration of gravity (g) in local reference axes X and Y, and calculating said perpendicular wind speed component as a function of said transverse swing angle;

if said monitored motion is determined to comprise an Aeolian vibration, measuring a frequency of said Aeolian vibration using data provided by said accelerometer and calculating said perpendicular wind speed component as a linear proportional function of said Aeolian vibration frequency.

2. The method according to claim 1, wherein said function of the Aeolian vibration frequency is defined by the equation:

$$u(f) = \frac{f \cdot d}{Str}$$

wherein u(f) is the perpendicular wind speed component calculated as a function of the Aeolian vibration frequency, f is the Aeolian vibration frequency, d is a cross-sectional diameter of the cable, and Str a Strouhal number of the cable.

3. The method according to claim 1, wherein said function of the transverse swing angle is defined by the equation:

$$u(\vartheta) = \sqrt{k_i g \tan\vartheta}$$

wherein u(ϑ) is the perpendicular wind speed component calculated as a function of the transverse swing angle, ϑ the transverse swing angle, g the acceleration of gravity, and $k_i$ a predetermined coefficient.

4. The method according to claim 3, wherein said predetermined coefficient $k_i$ is at least initially calculated according to the equation:

$$k_i = 2\frac{\rho_c}{\rho_f c_D d}$$

wherein $\rho_c$ is a linear density of the cable, $\rho_f$ is an air density, $c_D$ an aerodynamic drag coefficient of the cable, and d a cross-sectional diameter of the cable.

5. The method according to claim 3, wherein said transverse swing angle of the suspended cable span is measured even when said motion is determined to comprise an Aeolian vibration, and said predetermined coefficient $k_i$ is then recalculated according to the equation:

$$k_i = \frac{[u(f)]^2}{g \tan\vartheta}$$

wherein u(f) is the perpendicular speed component calculated as a function of the Aeolian vibration frequency.

6. The method according to claim 5, wherein said predetermined coefficient $k_i$ is recalculated when said motion is determined to comprise an Aeolian vibration only if the perpendicular wind speed component and/or said transverse swing angle exceed a predetermined threshold.

7. The method according to claim 1, wherein said predetermined frequency range is above 0 Hz and not higher than 150 Hz.

8. The method according to claim 1, wherein the first predetermined threshold for said positive correlation coefficient is at least 0.75.

9. The method according to claim 1, wherein the second predetermined threshold for said ratio between vertical and horizontal vibration components is at least 3.

10. A method for measuring an effective incident radiation on a suspended span of electrically conductive cable, comprising the steps of:
measuring a perpendicular wind speed component with respect to said suspended cable span using the method according to claim 1;
measuring an ambient temperature;
measuring a temperature of said suspended cable span;
measuring an electric current circulating through said suspended cable span;
calculating a convective heat loss rate of said suspended cable span as a function of said ambient temperature, said temperature of the suspended cable span and said perpendicular wind speed component;
calculating a radiated heat loss rate of said suspended cable span as a function of said ambient temperature and said temperature of the suspended cable span;
calculating a resistive heat gain rate as a function of said electric current and said temperature of the suspended cable span; and
calculating said effective incident radiation as a function of said convective heat loss rate, radiated heat loss rate and resistive heat gain rate.

11. The method according to claim 10, wherein said effective incident radiation is calculated as the sum of said convective heat loss rate and radiated heat loss rate minus said resistive heat gain rate.

12. The method according to claim 10, wherein said temperature of the suspended cable span is measured by:
measuring a sag of the suspended cable span; and
calculating the temperature of the suspended cable span as a function of said sag.

13. A method for determining a maximum allowable current rating for a suspended span of electrically conductive cable, comprising the steps of:
determining a maximum allowable sag for said suspended cable span;
calculating a maximum allowable temperature for said suspended cable span as a function of said maximum allowable sag;
measuring an effective incident radiation on said suspended cable span, together with a perpendicular wind speed component and an ambient temperature, using the method according to claim 10;
calculating a convective heat loss rate of said suspended cable span for said maximum allowable temperature of the suspended cable span with said maximum allowable temperature of the suspended cable span and said perpendicular wind speed component;
calculating a radiated heat loss rate of said suspended cable span for said maximum allowable temperature with said ambient temperature;
calculating an electric resistance of said suspended cable span at said maximum allowable temperature; and
calculating said maximum allowable current rating as a function of said effective incident radiation and said convective heat loss rate, radiated heat loss rate and resistance at said maximum allowable temperature.

14. A method for supplying electric power over a power line comprising a suspended span of electrically conductive cable, comprising the steps of:
determining a maximum allowable current rating for said suspended span of electrically conductive cable according to the method of claim 13; and
limiting a current passing through said power line at or below said maximum allowable current rating.

15. A non-transitory computer-readable medium with instruction stored thereon, that when executed by a computer processor, performs the steps of the method according to claim 1, when the computer processor is remotely connected to the autonomous device comprising the three-axis accelerometer for monitoring the motion of the at least one point of said suspended cable span over the time interval.

16. A system for measuring a perpendicular wind speed component with respect to a suspended cable span, said system comprising:
an autonomous device clamped to the suspended cable span, comprising a three-axis accelerometer for monitoring the motion of at least one point of said suspended cable span in at least two axes perpendicular to the cable span over a time interval, wherein said three-axis accelerometer has a resolution equal to or below 100 micro-G; and
a data processing device, remotely connected to said autonomous device, comprising the three-axis accelerometer and configured to implement the successive steps of:
determining whether said monitored motion comprises an Aeolian vibration, the vibration due to von Karman vortices generated alternately above and below the suspended cable span, said monitored motion being determined to comprise an Aeolian vibration if frequency analysis of the motion during a successive series of analysis periods within said time interval reveals vibration frequencies within a predetermined frequency range, with a positive correlation coefficient between the revealed vibration frequencies in said successive analysis periods being above a first predetermined threshold and/or with a ratio between vertical and horizontal vibration components above a second predetermined threshold; and
if said monitored motion is not determined to comprise an Aeolian vibration, measuring a transverse swing angle of the suspended cable span, from the sensing by said accelerometer of two separate static components (gx, gy) of the acceleration of gravity (g) in local reference axes X and Y, and calculating said perpendicular wind speed component as a function of said transverse swing angle;
if said monitored motion is determined to comprise an Aeolian vibration, measuring a frequency of said Aeolian vibration using data provided by said accelerometer and calculating said perpendicular wind speed component as a linear proportional function of said Aeolian vibration frequency.

* * * * *